US009379389B2

(12) United States Patent
Jung et al.

(10) Patent No.: US 9,379,389 B2
(45) Date of Patent: Jun. 28, 2016

(54) METHOD FOR PRODUCING POROUS CARBON MATERIALS HAVING MESOPORES AND CATALYST SUPPORT FOR A FUEL CELL PRODUCED USING SAME

(75) Inventors: Doo-Hwan Jung, Daejeon (KR); Sang-Kyung Kim, Daejeon (KR); Seong-Yop Lim, Daejeon (KR); Dong-Hyun Peck, Daejeon (KR); Byung-Rok Lee, Daejeon (KR); Ki-Don Nam, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 55 days.

(21) Appl. No.: 13/885,174

(22) PCT Filed: Nov. 16, 2011

(86) PCT No.: PCT/KR2011/008750
§ 371 (c)(1),
(2), (4) Date: May 14, 2013

(87) PCT Pub. No.: WO2012/067421
PCT Pub. Date: May 24, 2012

(65) Prior Publication Data
US 2013/0236816 A1    Sep. 12, 2013

(30) Foreign Application Priority Data
Nov. 16, 2010 (KR) .................. 10-2010-0113661

(51) Int. Cl.
*C01B 31/02*    (2006.01)
*H01M 4/86*    (2006.01)
*H01M 4/96*    (2006.01)
*H01M 8/10*    (2016.01)

(52) U.S. Cl.
CPC ............. *H01M 4/8663* (2013.01); *C01B 31/02* (2013.01); *H01M 4/96* (2013.01); *H01M 2008/1095* (2013.01); *Y02E 60/50* (2013.01)

(58) Field of Classification Search
CPC ...................................................... C01B 31/02
See application file for complete search history.

(56) References Cited

U.S. PATENT DOCUMENTS

| 4,499,201 A * | 2/1985 | Leyerle ............... 502/180 |
| 8,114,372 B2 * | 2/2012 | Pak et al. ............ 423/414 |

FOREIGN PATENT DOCUMENTS

| KR | 10-0612896 | 8/2006 |
| KR | 10-2007-0021846 | 2/2007 |
| KR | 10-2009-0100625 | 9/2009 |
| KR | 10-2010-0080420 | 7/2010 |
| KR | 10-0983059 | 9/2010 |

OTHER PUBLICATIONS

R. Kamalakaran et al. "In-situ formation of carbon nanotubes in an alumina-nanotube composite by spray pyrolysis", Carbon vol. 41, Oct. 15, 2003, pp. 2737-2741.
Office Action, Korean Intellectual Property Office, Mar. 28, 2012, Application No. 10-2010-0113661.

* cited by examiner

*Primary Examiner* — Stuart Hendrickson

(57) ABSTRACT

The present invention relates to a method for producing porous carbon materials comprising the following steps: (S1) forming carbon coatings on surfaces of ceramic nanoparticles; (S2) mixing carbon precursors and ceramic nanoparticles on which carbon coatings are formed in the step (S1); (S3) heat-treating the mixture of the ceramic nanoparticles having carbon coatings thereon and carbon precursors, prepared in the step (S2) to carbonize the mixture; and (S4) removing the ceramic nanoparticles from the material obtained in the step (S3). The method for producing porous carbon materials according to the present invention enables porous carbon materials in which mesopores are uniformly distributed, to be mass produced with low costs. The porous carbon materials having mesopores may be used as catalyst supports for fuel cells, and thus may be used in producing electrodes for fuel cells.

11 Claims, 3 Drawing Sheets

METHOD FOR PRODUCING POROUS CARBON MATERIALS HAVING MESOPORES AND CATALYST SUPPORT FOR A FUEL CELL PRODUCED USING SAME

TECHNICAL FIELD

The present invention relates to a method of producing a porous carbon material having mesopores and a catalyst support or an electrode material for a fuel cell produced using the same, and, more particularly, to a method of producing a porous carbon material by forming a carbon film on the surfaces of ceramic nanoparticles, mixing the ceramic nanoparticles with a carbon precursor, heat-treating the mixture so as to be carbonized, and removing the ceramic nanoparticles, and to a catalyst support or an electrode material for a fuel cell, produced using the same.

BACKGROUND ART

The recent research into catalysts largely includes the development of catalyst supports having a large surface area and the preparation of nano-sized catalyst metals. In particular, development of novel catalyst support materials having a large surface area with the low preparation cost is regarded as having a very high added value.

Porous carbon materials have high industrial availability, and are currently utilized in a variety of fields. For example, these materials are employed as selective adsorbents in separation, adsorption removal and gas storage, electrode materials in batteries, fuel cells, high-capacity capacitors, etc., and catalyst supports or catalysts in main catalyst processes.

In accordance with IUPAC (International Union of Pure and Applied Chemistry), porous carbon materials may be classified into micropores (pore size<2 nm), mesopores (2 nm<pores size<50 nm), and macropores (pore size>50 nm), depending on the pore size. Commercially available porous carbon is exemplified by activated carbon mainly having micropores, and the basic concept of a conventional pore formation process is that pores are introduced using an oxidizable gas or a corrosive compound while carbonizing various organic materials, including coal, petroleum pitch, wood tar, fruit shells, a variety of polymers, etc.

The activated carbon mainly having micropores has a very high specific surface area and pore volume, with significant adsorption capacity. However, the drawbacks of microporous carbon have been pointed out, which include a drastically lowered molecular mass transfer rate due to space constraints of excessively small pores, significant loss of electrical conductivity due to large surface functional groups and structural defects, easy deformation or breakdown of the porous structure due to high-temperature treatment, etc. In particular, a compromise between increasing an active area through a high specific surface area and appropriately maintaining electrical conductivity may be cited as the big issue in electrochemical applications. Further, in regard to efficient access of ions and molecules, problems related to the control of pore sizes have become a major issue. With the goal of solving the drawbacks of the activated carbon mainly having micropores and of achieving the requirements in specific applications including removal of offensive odors and VOC (Volatile Organic Chemical) and selective adsorption of large molecules such as protein, etc., research and development into preparation and application of mesoporous carbon materials is thoroughly ongoing these days.

The preparation of mesoporous carbon includes a template method including placing a polymer or a monomer into a ceramic template having mesopores, performing heat treatment for carbonization, and removing the ceramic template using acidic treatment and alkaline treatment. The porous carbon thus prepared is advantageous because the mesopore size distribution is very uniform, and the total pore size may be easily controlled. However, the template method is problematic because mass production of a template having a precisely controlled microstructure, for example, zeolite or mesoporous silica, is difficult, and the price thereof is high. Furthermore, the removal of the template after the preparation of mesoporous carbon is performed using hydrofluoric acid, which is expensive and complicated. Hence, mass production of mesoporous carbon or use thereof as a universal material has suffered.

Another preparation method includes a movable template method including kneading nano-sized ceramic particles with an organic precursor, performing heat treatment for carbonization at an appropriate temperature, and removing the ceramic nanoparticles using an acid and an alkali. Porous carbon having a uniform pore distribution corresponding to the conventional template method may be prepared using ceramic nanoparticles having a particle size uniformly controlled in the range of from ones of to tens of nanometers, and in consideration of the preparation cost and the mass production, methods are being developed which facilitate use in large amounts and are favorable in terms of price because they use particles such as MgO, $CaCO_3$ and so on, in which the particle size is slightly non-uniform and the preparation and removal treatments are comparatively simple. In this case, there should be devised methods able to prevent non-uniform particle distribution (pore distribution according thereto) due to a difference in density of materials in the course of the preparation process, including using nanoparticles which are a template in an amount equal to or more than the amount of the carbon material, or using a surfactant to stabilize the dispersion of particles, etc.

Recently a so-called soft template method which is used to solve the problems of the conventional metal oxide template method is receiving attention thanks to its self-assembly properties using amphiphilic molecules such as a surfactant or a block copolymer. This method is advantageous because the synthesis process is very simple and uniform mesopores may be introduced, but is problematic because the price burden of the block copolymer, etc., cannot be overcome by the current technique.

Catalyst supports having mesopores are expected to be suitable for use in electrode catalysts and the like for fuel cells in terms of efficient access of reactants and products, in particular, liquid materials, and many cases in which performance of fuel cells has been improved thereby have been reported. In order to achieve physical and chemical adsorption with catalysts, it is known that the specific surface area, pore size, pore distribution, pore shape and surface functional groups of the catalyst supports for fuel cells have an influence on high dispersion of catalysts and catalytic activity, and also electrical conductivity, chemical durability, mechanical strength, etc., are required. Although carbon black and carbon materials having nanostructures of various shapes have been utilized to date as the catalyst supports for fuel cells, lots of improvements thereof are required to develop inexpensive catalysts having high activity.

The present inventors have performed studies on catalyst supports having mesopores to develop catalysts having high activity while requiring low costs, and thus have discovered that a porous carbon material having a large number of pores with a unique mesoporous structure may be prepared by forming a carbon film on the surfaces of ceramic nanoparticles, mixing the ceramic nanoparticles with a carbon precursor, and performing heat treatment for carbonization, thus culminating in the present invention.

DISCLOSURE

Technical Problem

Accordingly, an object of the present invention is to provide a method of producing a porous carbon material having a uniform mesopore distribution, suitable for use as a catalyst support for a fuel cell.

Another object of the present invention is to provide a method of producing a porous carbon material having a large number of mesopores with a unique mesoporous structure.

A further object of the present invention is to provide a method of producing a porous carbon material having mesopores, which may decrease the production cost and is adapted for mass production.

Technical Solution

In order to accomplish the above objects, the present invention provides a method of producing a porous carbon material having mesopores, comprising (S1) forming a carbon film on the surfaces of ceramic nanoparticles; (S2) mixing the ceramic nanoparticles having the carbon film obtained in (S1) with a carbon precursor; (S3) heat-treating the mixture obtained in (S2) comprising the ceramic nanoparticles having the carbon film and the carbon precursor so as to be carbonized; and (S4) removing the ceramic nanoparticles from the material obtained in (S3).

In addition, the present invention provides a carbon material having mesopores, produced using the above method.

In addition, the present invention provides a catalyst support or an electrode material for a fuel cell, comprising the porous carbon material having mesopores.

In addition, the present invention provides an electrode for a fuel cell, comprising the above catalyst support and a catalyst supported on the support.

In addition, the present invention provides an electrode for a fuel cell, using the above electrode material as a main material for a microporous layer.

Advantageous Effects

The present invention provides a method of producing a porous carbon material by forming a carbon film on the surfaces of ceramic nanoparticles, mixing the ceramic nanoparticles with a carbon precursor, heat-treating the mixture so as to be carbonized, and removing the ceramic nanoparticles, and also provides a catalyst support or an electrode material for a fuel cell, produced using the same. The method of producing the porous carbon material according to the present invention enables the porous carbon material having a uniform mesopore distribution to be mass produced with the low production cost. Further, the porous carbon material having mesopores, produced according to the present invention, can be used as a catalyst support for a fuel cell, and can thus be utilized to manufacture an electrode for a fuel cell.

MODE FOR INVENTION

Figure 1:
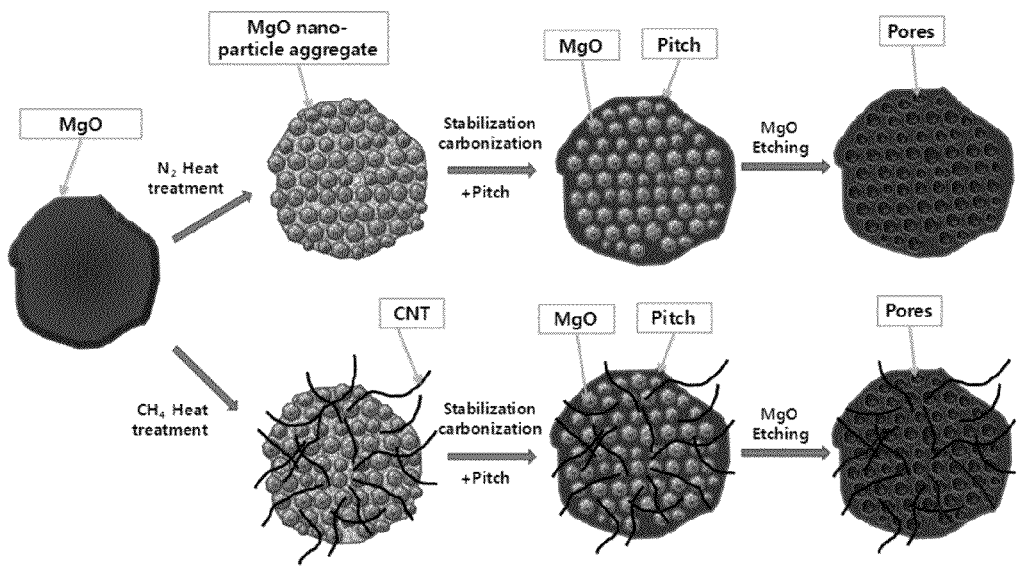
FIG. 1 schematically illustrates the production of porous carbon materials using nano-sized MgO and MgO/CNT in Example 1 according to the present invention.

Hereinafter, a detailed description will be given of the present invention. In the description of embodiments of the present invention, a detailed description of the related known constructions or functions is omitted.

The terms or words used in the present specification and claims are not construed limitedly as typical or dictionary meanings, and should be understood as meanings and concepts adapted for the scope of the present invention.

The examples described in the present specification and the constructions illustrated in the drawings are preferred embodiments of the present invention, and do not represent all of the technical ideas of the present invention and thus a variety of equivalents and modifications able to substituted therefor may be provided at the point of time of the present invention being filed.

According to the present invention, a method of producing a porous carbon material having mesopores includes (S1) forming a carbon film on the surfaces of ceramic nanoparticles; (S2) mixing the ceramic nanoparticles having the carbon film obtained in (S1) with a carbon precursor; (S3) heat-treating the mixture obtained in (S2) comprising the ceramic nanoparticles having the carbon film and the carbon precursor so as to be carbonized; and (S4) removing the ceramic nanoparticles from the material obtained in (S3).

Below is a description of the method of producing the porous carbon material having mesopores according to the present invention.

At first, the carbon film is formed on the surfaces of the ceramic nanoparticles (S1).

In the present invention, ceramic nanoparticles are used as a template for producing the porous carbon material having mesopores.

Examples of the ceramic nanoparticles may include $SiO_2$, $Al_2O_3$, MgO, $CaCO_3$, zeolite, aluminosilicate, mixtures thereof, etc.

The ceramic nanoparticles preferably have a particle size of 2~100 nm. If the particle size of the ceramic nanoparticles is less than 2 nm, it is not easy to manufacture such nanoparticles, and the pores of a porous carbon material resulting from using such ceramic nanoparticles as the template are micro-sized, which is not appropriate for the purpose of the present invention. In contrast, in the case where a porous carbon material is produced from the ceramic nanoparticles having a particle size exceeding 100 nm, the pores of the carbon formed in the porous carbon material are very large, which is also not appropriate for the purpose of the present invention to produce the porous carbon material having mesopores.

In the case where the ceramic nanoparticles are placed in an electrical furnace, a gaseous carbon-containing compound is added and pyrolysis is performed, the carbon film may be formed on the surfaces of the ceramic nanoparticles.

In an embodiment of the present invention, forming the carbon film on the surfaces of the ceramic nanoparticles may be performed by placing the ceramic nanoparticles in an electrical furnace, adding the gaseous carbon-containing compound, and performing pyrolysis at 350~950° C.

In the course of placing the ceramic nanoparticles in an electrical furnace, adding the gaseous carbon-containing compound, and performing pyrolysis, the pyrolysis temperature may be adjusted in the range of 350~950° C. depending on the kind of the carbon-containing compound. Adjusting the pyrolysis temperature depending on the kind of the carbon-containing compound is easy to those having ordinary knowledge in the art to which the present invention belongs.

The gaseous carbon-containing compound may be used by vaporizing any one selected from the group consisting of hydrocarbons having 1~4 carbons, carbon monoxide, alcohols, acetone, acetonitrile, and acrylonitrile, or may be used by vaporizing a gas mixture comprising any one of the above with hydrogen.

In another embodiment of the present invention, forming the carbon film on the surfaces of the ceramic nanoparticles may be performed by applying a compound including a metal component on the surfaces of the ceramic nanoparticles, placing the ceramic nanoparticles in an electrical furnace, adding the gaseous carbon-containing compound, and performing pyrolysis at 350~950° C.

In the case where the compound including the metal component is applied on the surfaces of the ceramic nanoparticles and then the carbon film is formed, the carbon film having grown carbon nanotubes or carbon nanofibers may be formed on the surfaces of the ceramic nanoparticles.

On the surfaces of the ceramic nanoparticles coated with the compound including the metal component, single-wall carbon nanotubes (SWNTs) or multi-wall carbon nanotubes (MWNTs) may be grown depending on the kind of the gaseous carbon-containing compound. For example, in the case where gaseous methane is used as the gaseous carbon-containing compound, the carbon film having grown SWNTs may be formed on the surfaces of the ceramic nanoparticles. In the case where gaseous acetone is used as the gaseous carbon-containing compound, the carbon film having grown MWNTs may be formed on the surfaces of the ceramic nanoparticles.

An example of the compound including the metal component may include a compound composed mainly of Ni, Co or Fe.

In an embodiment of the present invention, the compound composed mainly of Ni, Co or Fe may include a nitrate, a hydrochloride, a sulfate, a phosphate, or an organic metal compound (ferrocene, nickelocene, etc.), including a binary or ternary alloy catalyst, for example, NiFe, NiMo, NiCu, CoMo, CoCu, FeMo, NiCr, NiPt, NiFeMo, etc., comprising at least one metal selected from the group consisting of Ni, Co and Fe, and a co-catalyst component selected from the group consisting of Mo, Cu, Cr, Pt, Ru and Pd.

The compound composed mainly of Ni, Co or Fe is preferably applied on the surfaces of the ceramic nanoparticles at a weight ratio of 0.001~0.1 relative to the weight of the ceramic nanoparticles.

In (S1), the carbon film may be formed at a thickness of 1~10 nm on the surfaces of the ceramic nanoparticles.

Subsequently, the ceramic nanoparticles having the carbon film obtained in (S1) are mixed with the carbon precursor (S2).

The carbon precursor may include an organic compound having high hydrophobicity, such as isotropic pitch, mesophase pitch, a polycyclic aromatic mixture, a phenol resin, a polystyrene resin, a mixture thereof, etc. Preferably useful is pitch having a carbonization yield of about 80% from the industrial point of view.

The ceramic nanoparticles are hydrophilic, and the carbon precursor is hydrophobic, making it difficult to mix them. However, in the case where the carbon film is formed on the surfaces of the ceramic nanoparticles in (S1), the ceramic nanoparticles having the carbon film are hydrophobic and thus may be uniformly mixed with the carbon precursor. When the mixture comprising the ceramic nanoparticles having the carbon film and the carbon precursor, which are uniformly mixed together, is heat-treated and thus carbonized in (S3), the porous carbon material having a uniform mesopore distribution may be produced.

The mixture obtained in (S2) comprising the ceramic nanoparticles having the carbon film and the carbon precursor is preferably prepared by mixing 10~80 wt % of the ceramic nanoparticles having the carbon film with 20~90 wt % of the carbon precursor.

Upon preparation of the mixture, if the amount of the ceramic nanoparticles having the carbon film is less than 10 wt %, the number of pores is lowered in the finally produced porous carbon material, and a plurality of closed pores may be formed. In contrast, upon preparation of the mixture, if the amount of the ceramic nanoparticles having the carbon film exceeds 80 wt %, the porous structure may not be formed in the finally produced porous carbon material.

Subsequently, the mixture obtained in (S2) comprising the ceramic nanoparticles having the carbon film and the carbon precursor is heat-treated so as to be carbonized (S3).

In an embodiment of the present invention, (S3) may include heat-treating the mixture at 200~400° C. for 0.5~10 hr so as to be stabilized, and then heat-treating the mixture at 700~1200° C. for 1~3 hr in an inert atmosphere so as to be carbonized.

In the case where the mixture comprising the ceramic nanoparticles having the carbon film and the carbon precursor is stabilized and carbonized under the above conditions, a variety of components other than carbon of the carbon precursor, for example, oxygen, hydrogen, nitrogen, sulfur, etc., may be vaporized and removed. In this way, the components other than carbon are vaporized and removed, and atomic carbon is carbonized while being partially decomposed, thus forming a solid which becomes denser, that is, a porous carbon material having high density.

Figure 6:
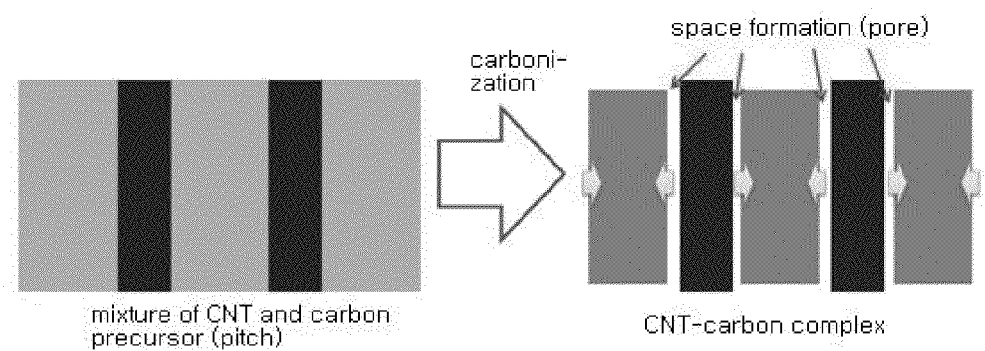
FIG. 6 schematically illustrates the formation of mesopores by heat-treating a mixture comprising ceramic nanoparticles having a carbon film and a carbon precursor so as to be carbonized.

FIG. 6 schematically illustrates the formation of mesopores by heat-treating the mixture comprising the ceramic nanoparticles having the carbon film and the carbon precursor so as to be carbonized.

With reference to FIG. 6, in the course of the mixture comprising the ceramic nanoparticles having the carbon film and the carbon precursor being heat-treated to be carbonized, the volume of the carbon precursor is drastically decreased when viewed externally. The portion of the mixture whose volume and composition are changed during the carbonization is only the carbon precursor, and the ceramic nanoparticles and the carbon nanofibers or carbon nanotubes (black portion) formed on the surfaces thereof are barely changed in external shape thereof. Specifically, as the carbon precursor which is carbonized via heat treatment is contracted, predetermined spaces are formed outside the ceramic nanoparticles having low thermal deformation and the carbon nanofibers or carbon nanotubes attached to the surfaces thereof, thereby obtaining a porous carbon material having mesopores with a unique structure.

Finally in (S4), the ceramic nanoparticles are removed from the material obtained in (S3).

In (S4), the material obtained in (S3) is immersed in an acidic solution or an alkaline solution, thus removing the ceramic nanoparticles.

In the present invention, in the case where MgO or $CaCO_3$ is used as the ceramic nanoparticles, hydrochloric acid is used in (S4) to remove the ceramic nanoparticles, and thereby the residue of the nanoparticles may be minimized. Also, in the case where $SiO_2$, $Al_2O_3$ or zeolite is used as the ceramic nanoparticles, the ceramic nanoparticles may be removed using a strong alkaline aqueous solution or hydrofluoric acid in (S4), thereby minimizing the residue of the nanoparticles.

The acidic solution may include hydrochloric acid, sulfuric acid, nitric acid, phosphoric acid, hydrofluoric acid, etc., and the alkaline solution may be an aqueous solution including potassium hydroxide or sodium hydroxide. Any solution may be used without limitation so long as it may efficiently remove the ceramic nanoparticles.

The present invention may provide a porous carbon material having mesorpores produced as above. The porous carbon material having mesopores according to the present invention may be used as the catalyst support to manufacture an electrode for a fuel cell.

Further, the porous carbon material according to the present invention may be utilized as a material for a microporous layer (MPL) formed on a gas diffusion layer such as carbon paper, carbon pelt, etc.

Below, preferred examples of the present invention are specified.

Example 1

$Mg(NO_3)_2 \cdot 6H_2O$ (99%) was used as a precursor to manufacture nano-sized MgO particles, and $(NH_4)_6Mo_7O_{24} \cdot 4H_2O$ and $Fe(NO_3)_3 \cdot 9H_2O$ were used as catalyst precursors to form a carbon film, and these were reacted with $C_6H_8O_7$ (citric acid), so that MgO was impregnated with a MoFe catalyst. Each of $Mg(NO_3)_2 \cdot 6H_2O$, $(NH_4)_6Mo_7O_{24} \cdot 4H_2O$ and $Fe(NO_3)_2 \cdot 9H_2O$ was dissolved in distilled water, mixed with $C_6H_8O_7$, stirred at 90° C., and dried. The dried powder was heat-treated at 180° C. for 2 hr in a nitrogen atmosphere to form MgO particles. To manufacture MgO particles having various nano sizes, the temperature was increased at 10° C./min, and heat treatment was performed at 350~950° C. As such, a mixture of a gaseous carbon-containing compound, that is, methane, and nitrogen was allowed to flow ($CH_4/N_2$ (100/500 ml/min)), and pyrolysis was carried out at 350~950° C., thus forming the MgO particles having the carbon film (SWNTs) thereon.

To produce porous carbon materials, mesophase pitch (Mitsubishi AR pitch) was used as a carbon precursor, dissolved in 500 ml of THF, mixed with nano MgO powders and MgO powders comprising the MgO nanoparticles having the carbon film at different sizes, sealed and stirred for 24 hr, and dried. These mixtures were heated at a rate of 1° C./min in an air atmosphere and stabilized at 260° C. for 48 hr, and then heated at a rate of 0.5° C./min in a nitrogen atmosphere, and maintained at 1000° C. for 4 hr so as to be carbonized. The carbonized carbon materials were stirred in a 1M HCl aqueous solution for 24 hr, thus removing MgO, and several washings with distilled water were performed, thus removing the remaining HCl and impurities, followed by drying at 80° C., thereby producing porous carbon materials having mesopores (FIGS. 1 to 3).

Figure 2:
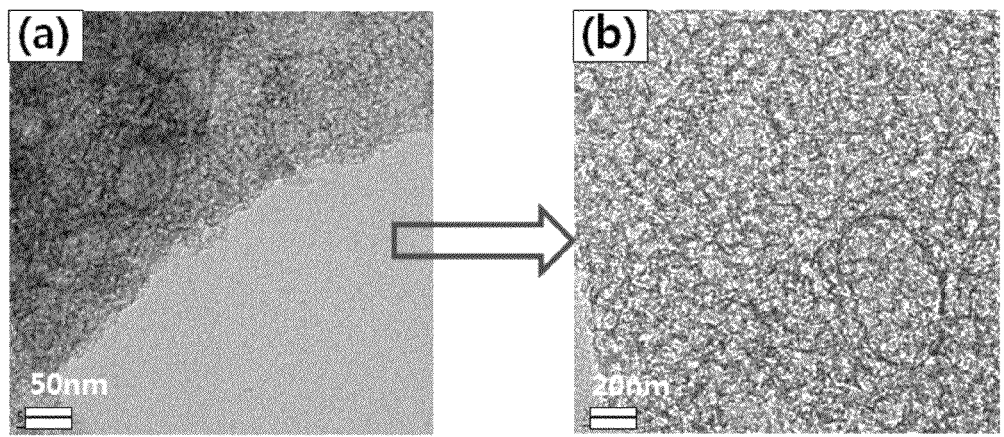
FIGS. 2 and 3 illustrate transmission electron microscope (TEM) images of the porous carbon materials having mesopores produced in Example 1 according to the present invention.
Figure 3:
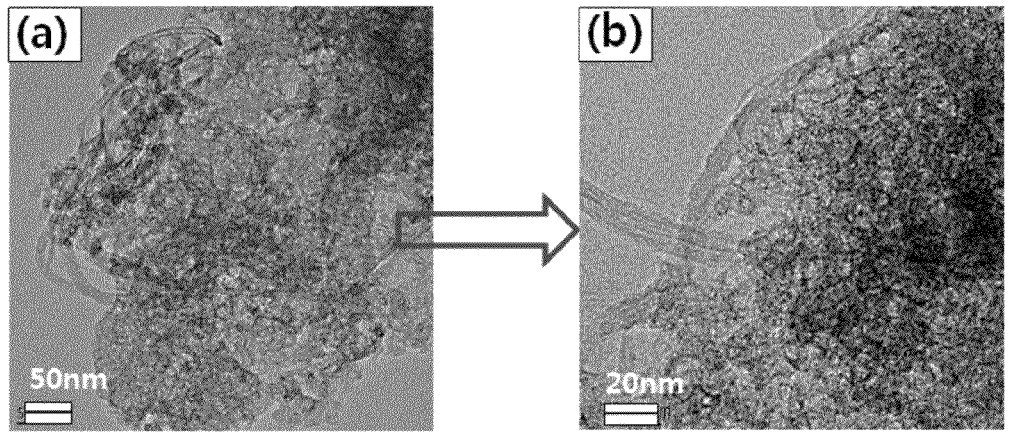

FIG. 1 schematically illustrates the production of the porous carbon materials using nano-sized MgO and MgO/CNT in Example 1 according to the present invention, and FIGS. 2 and 3 illustrate TEM images of the porous carbon materials having mesopores produced in Example 1 according to the present invention.

Example 2

A porous carbon material having mesopores was produced in the same manner as in Example 1, with the exception that acetone was used as the gaseous carbon-containing compound. The TEM images thereof are illustrated in FIG. 5.

As seen in FIGS. 1 and 2, the porous carbon material having mesopores according to the present invention has a porous structure on the surface thereof, and as seen in FIGS. 1 and 3, SWNTs are grown on the surface of the porous carbon material having mesopores.

Figure 4:
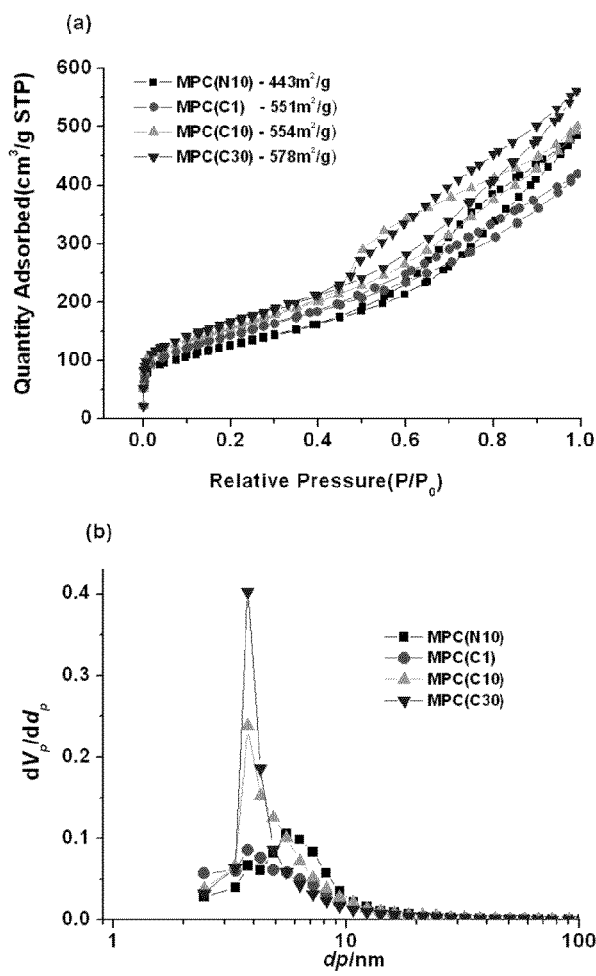
FIG. 4 illustrates nitrogen adsorption isothermal curves of the porous carbon materials having mesopores produced in Example 1 according to the present invention.

As seen in FIG. 4, nano-sized MgO is formed via nitrogen heat treatment, and the porous carbon material produced using the same has a specific surface area increased up to 443 $m^2/g$ (MPC(N10)) with a very large number of mesopores (hysteresis). Also, the porous carbon material produced from the nano-sized MgO and the SWNTs formed using methane is seen to have mesopores and a higher specific surface area of 551~578 $m^2/g$ (MPC (C1~30)).

Figure 5:
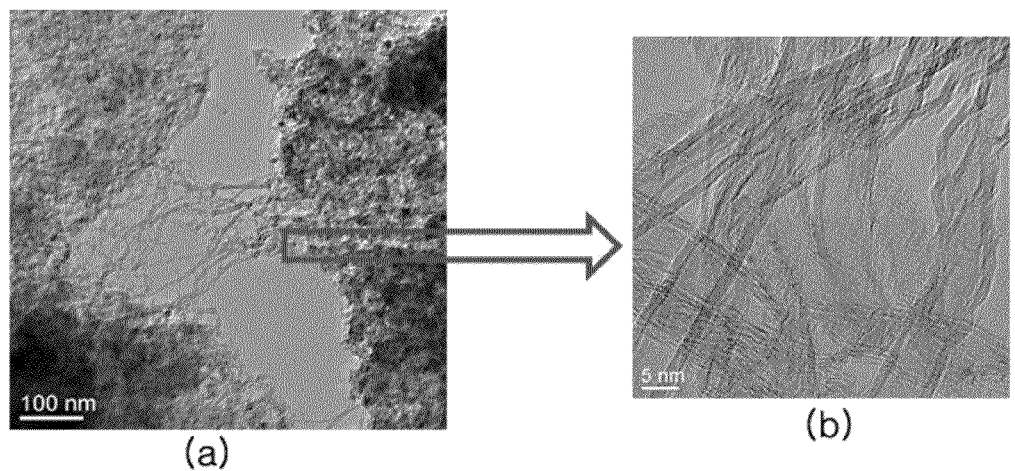
FIG. 5 illustrates TEM images of a porous carbon material having mesopores produced in Example 2 according to the present invention.

As seen in FIG. 5, the porous carbon material having mesopores according to the present invention has a porous structure on the surface thereof, with grown MWNTs.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Therefore, the scope of the present invention is not limited to the illustrated embodiments, and should be construed to be determined by the appended claims.

The invention claimed is:

1. A method of producing a porous carbon material having mesopores, comprising:
   (S1) forming a carbon film on surfaces of ceramic nanoparticles;
   (S2) mixing the ceramic nanoparticles having the carbon film obtained in (S1) with a carbon precursor;
   (S3) heat-treating a mixture obtained in (S2) comprising the ceramic nanoparticles having the carbon film and the carbon precursor so as to be carbonized; and
   (S4) removing the ceramic nanoparticles from a material obtained in (S3),
   wherein (S1) comprises placing the ceramic nanoparticles in an electrical furnace, adding a gaseous carbon-containing compound, and performing pyrolysis at 350~950° C., thereby forming the carbon film on the surfaces of the ceramic nanoparticles.

2. The method of claim 1, wherein the ceramic nanoparticles are selected from the group consisting of $SiO_2$, $Al_2O_3$, MgO, $CaCO_3$, zeolite, aluminosilicate, and mixtures thereof.

3. The method of claim 1, wherein the ceramic nanoparticles have a particle size of 2~100 nm.

4. The method of claim 1, wherein in (S1), the carbon film is formed at a thickness of 1~10 nm on the surfaces of the ceramic nanoparticles.

5. The method of claim 1, wherein the gaseous carbon-containing compound is any one selected from the group consisting of hydrocarbons having 1~4 gaseous carbons, carbon monoxide, alcohols, acetone, acetonitrile and acrylonitride, or a gas mixture comprising the any one and hydrogen.

6. The method of claim 1, wherein the carbon precursor is selected from the group consisting of isotropic pitch, mesophase pitch, a polycyclic aromatic mixture, a phenol resin, a polystyrene resin, and mixtures thereof.

7. The method of claim 1, wherein the mixture obtained in (S2) is prepared by mixing 10~80 wt % of the ceramic nanoparticles having the carbon film and 20~90 wt % of the carbon precursor.

8. The method of claim 1, wherein (S3) comprises heat-treating the mixture obtained in (S2) at 200~400 C for 0.5~24 hr so as to be stabilized, and then heat-treating the mixture at 700~1200° C. for 1~3 hr in an inert atmosphere so as to be carbonized.

9. The method of claim 1, wherein (S4) comprises immersing the material obtained in (S3) in an acidic solution or an alkaline solution, thus removing the ceramic nanoparticles.

10. The method of claim 9, wherein the acidic solution is selected from the group consisting of hydrochloric acid, sulfuric acid, nitric acid, phosphoric acid and hydrofluoric acid.

11. The method of claim 9, wherein the alkaline solution is an aqueous solution including potassium hydroxide or sodium hydroxide.

* * * * *